United States Patent
Jason, Jr.

(10) Patent No.: US 7,028,332 B1
(45) Date of Patent: Apr. 11, 2006

(54) METHOD AND APPARATUS FOR PREVENTING PACKET RETRANSMISSIONS DURING IPSEC SECURITY ASSOCIATION ESTABLISHMENT

(75) Inventor: James L. Jason, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 09/592,841

(22) Filed: Jun. 13, 2000

(51) Int. Cl.
*H04L 9/00* (2006.01)
*G01S 11/30* (2006.01)

(52) U.S. Cl. ............................ 726/1; 726/15; 713/151; 713/153

(58) Field of Classification Search ........ 713/150–151, 713/153–154, 160, 168, 200–201; 370/229; 380/277, 283; 709/230
See application file for complete search history.

(56) References Cited

U.S. PATENT DOCUMENTS

| | | | |
|---|---|---|---|
| 6,253,321 B1 * | 6/2001 | Nikander et al. ........... 713/160 |
| 6,347,376 B1 * | 2/2002 | Attwood et al. ............ 713/201 |
| 6,438,612 B1 * | 8/2002 | Ylonen et al. .............. 709/249 |
| 6,519,636 B1 * | 2/2003 | Engel et al. ................ 709/223 |

* cited by examiner

*Primary Examiner*—Gilberto Barron, Jr.
*Assistant Examiner*—Minh Dinh
(74) *Attorney, Agent, or Firm*—Blakely, Sokoloff, Taylor & Zafman LLP (57) ABSTRACT

Methods and apparatus for preventing packet retransmissions during Internet Protocol security (IPsec) security association establishment. Application socket requests are monitored. An application requests a Transmission Control Protocol (TCP) connection or transmission of User Datagram Protocol (UDP) data on a socket. A determination is made whether there is an active security association that exists to protect network flow associated with the request. The request is prevented from proceeding if no active security association exists to protect the network flow. A determination is made whether a security policy exists for the network flow if no active security association exists to protect the network flow. A security association negotiation component is alerted to initiate negotiation for a security association based on the security policy if the security policy exists for the network flow. The request is allowed to proceed, i.e. the TCP connection established or the UDP data sent, if the active security association exists or the security association is established from the negotiation.

25 Claims, 5 Drawing Sheets

PRIOR ART

FIG. 1

PRIOR ART

METHOD AND APPARATUS FOR PREVENTING PACKET RETRANSMISSIONS DURING IPSEC SECURITY ASSOCIATION ESTABLISHMENT

BACKGROUND

1. Field

This invention relates to Internet Protocol security (IPsec) protocol secure channels, and more specifically to preventing unnecessary packet retransmissions during IPsec security association establishment.

2. Background

IPsec is a standard-based network security protocol that is positioned at the network layer (OSI layer 3) of the Transmission Control Protocol/Internet Protocol (TCP/IP) stack. To protect a network flow, IPsec performs processing on outgoing and incoming packets using a security association. This security association describes the network packet flow information (IP addresses, protocol and ports) and the protection suite (algorithms, etc.) used to protect the network packet flow. Variations of IP addresses, protocols, and ports are used to define filters. When a host transmits a packet that matches filter information but is not currently being protected by an active security association, the Internet Key Exchange (IKE) protocol may be used to establish a security association with the communicating peer or network unit. Because of the time necessary for generating keys, network latencies, etc., the IKE negotiation may take some time. Until the security association is finally established, the IPsec packet classification driver has no choice but to discard packets that are to be protected by the security association under negotiation. This is because of the limited amount of non-paged memory in the operating system (OS) kernel.

For Transmission Control Protocol (TCP) communication, before any application data is sent, the TCP/IP stack sends a sync (SYN) packet. The SYN packet is used to begin the connection establishment procedure. Since TCP is a reliable protocol, when the network layer does not receive an acknowledgment from the communicating peer (because the driver never sent the packet, but instead discarded it), the network layer tries to retransmit the SYN packet. The timeout that TCP uses for retransmitting the packet starts out small. As more retransmissions are required, the timeout is increased.

Figure 1:
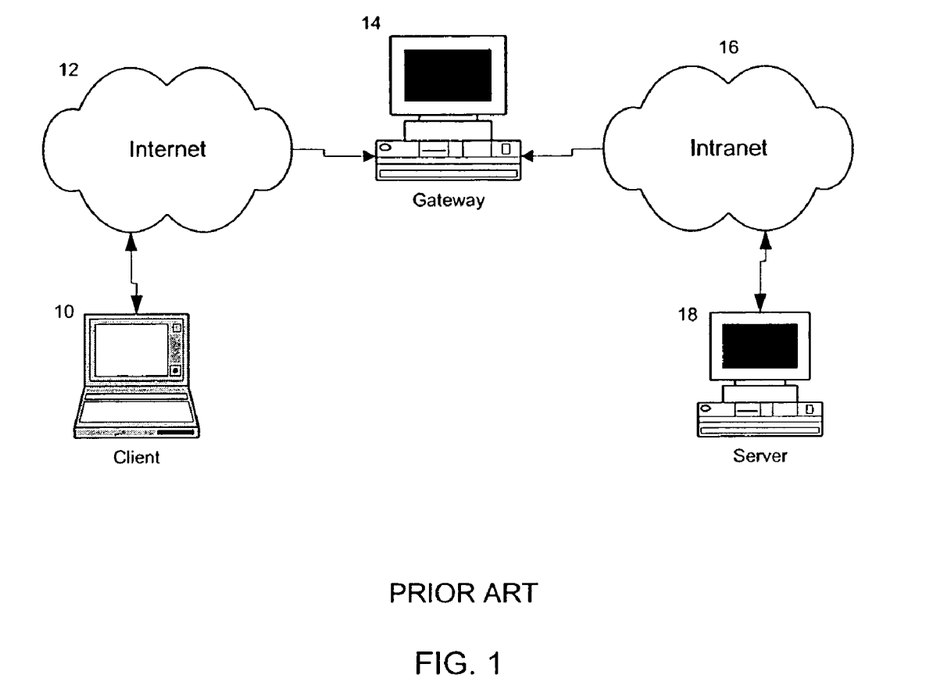
FIG. 1 is a diagram of an example system with a client and server on different networks connected through a gateway.

FIG. 1 shows a diagram of an example system containing a client, a gateway, and a server. Client 10 accesses a gateway 14 using the Internet 12. The gateway 14 protects access to devices on an Intranet 16 including server 18. To send data packets from client 10 to server 18, the client must first send a SYN packet to establish a connection with server 18.

Figure 2:
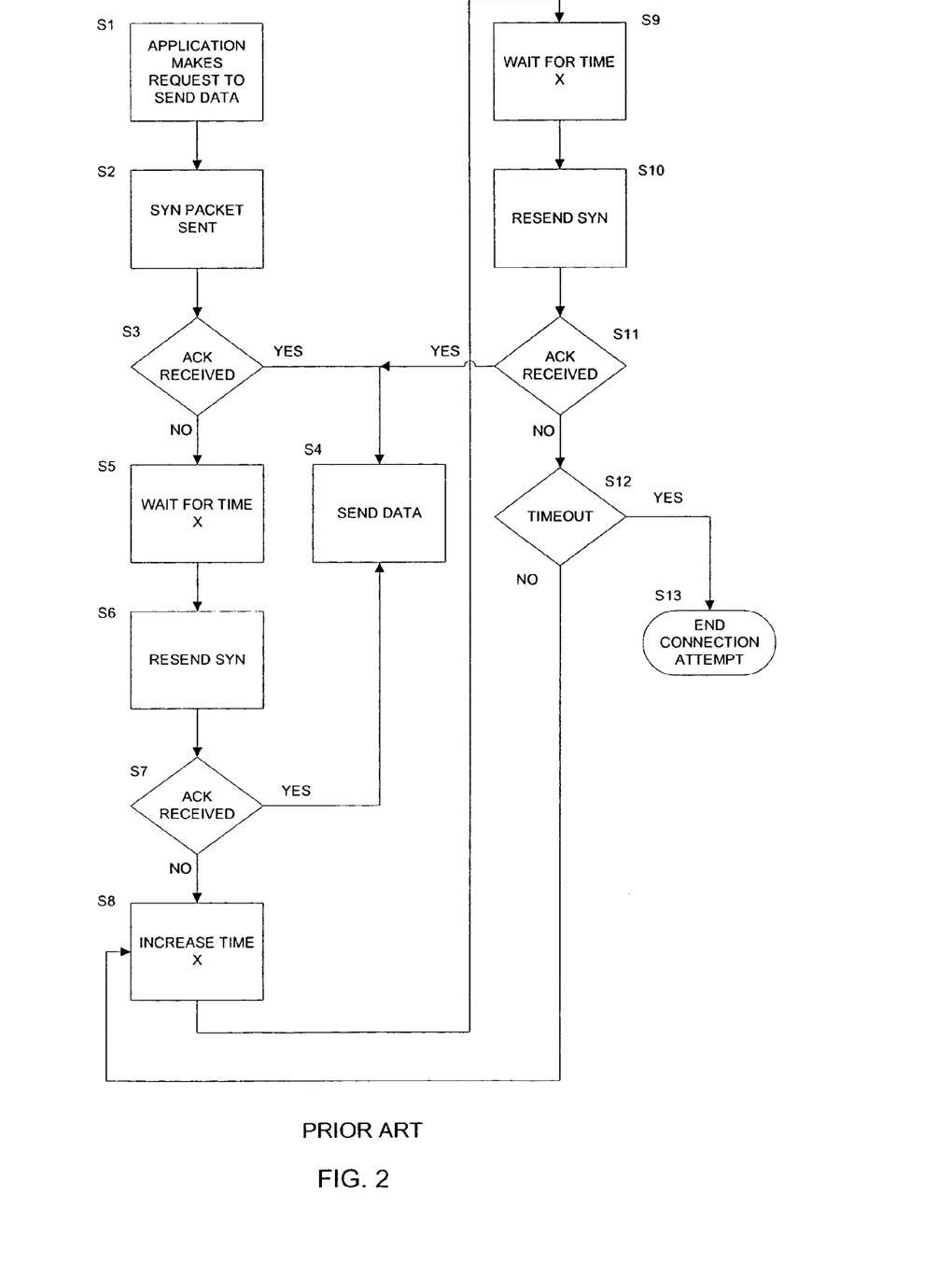
FIG. 2 is a flowchart of an example retransmission process.

FIG. 2 shows a flow chart of the retransmission process. An application at a host makes a request for a communication to be established to transfer data across a network to another device "communicating peer" (e.g., server) S1. Before the data is sent, a SYN packet is sent to the communicating peer S2. The network layer at the host unit determines if an acknowledgment from the communicating peer has been received, acknowledging that the SYN packet has been received at the communicating peer S3. If an acknowledgment has been received at the host, a communication channel is established and the data is sent S4. However, if an acknowledgment from the communicating peer has not been received, the network layer waits a particular length X of time S5. The network layer then resends the SYN packet S6. Again it is determined if an acknowledgment has been received from the communicating peer S7, and if so, the data packets are sent S4. If an acknowledgment has not been received from the communicating peer, then the time X is increased S8. The network layer at the host then waits for an amount of time equal to X S9, and then resends the SYN packet again S10. It is then determined whether an acknowledgment was received S11, and if so, the data is sent S4. This process is repeated until a timeout occurs S12, or an acknowledgment is received. If a timeout has occurred, the connection attempt is ended S13.

For an application which uses User Datagram Protocol (UDP) and provides its own reliability, the application will retransmit packets while the driver is dropping the packets and waiting for a security association to be established. Once a security association is established, the TCP/IP stack or the UDP-based application will wait, on the average, half of the current timeout value before sending the packet. As noted previously, trying to address the retransmission problem at the packet classification driver has problems in that because of buffer limitations in the operating system kernel, it is too late to mitigate packet transmissions by the time a packet reaches the IPsec packet classification driver. Further, the classification driver would have store the whole packet, but due to the speed of most systems, this would cause the packet classification driver's memory to fill up quickly causing the host unit to possibly stop.

Therefore, a mechanism is needed that can prevent these unnecessary packet retransmissions.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Implementation of a solution to the packet retransmission problem in the TCP/IP stack also has problems. The TCP/IP stack is usually an integral part of the operating system and, therefore, not modifiable unless the company owns the operating system source code. Therefore, including modifications to correct packet retransmissions would not be possible in the source code.

Moreover, to attempt to correct the packet retransmission problem at the application level, requires that information about the IPsec capabilities be made available to the applications. Also, the applications need to be rewritten to back off of connection establishment or UDP packet transmission until the IPsec security association is established. With this solution, the driver would set up a security association, and then send the data. However, here the advantage of a transparent IPsec implementation would be lost, namely, the tact that IPsec can protect network flows for legacy applications.

In methods and apparatus for preventing packet retransmissions according to the present invention, a network interceptor (i.e., network shim) is placed between the application and the TCP/IP stack. When an application on one unit desires to communicate with another application on another unit across a network, the application uses a socket. A socket is an abstraction that is used to represent one end point of a network communication. Since the network interceptor is between the application and TCP/IP stack, all requests for network communication must go through the network interceptor. The network interceptor can, therefore, monitor specific socket requests to make sure that IPsec security associations are in place before any packets are allowed to flow. Therefore, erroneous packet retransmissions are prevented.

Figure 3:
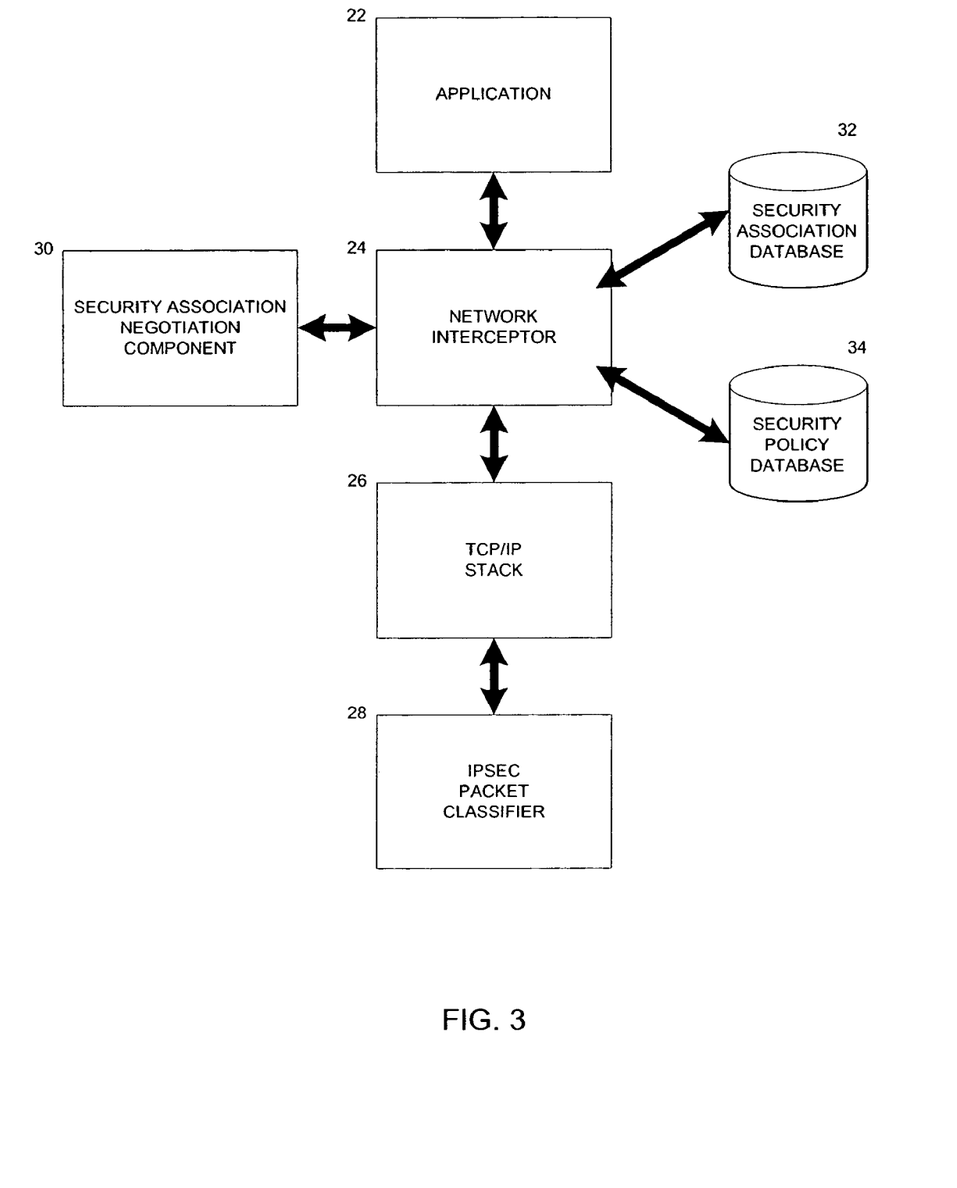
FIG. 3 is a block diagram of components of an example system for preventing packet retransmissions according to an example embodiment of the present invention.

FIG. 3 shows a block diagram of components of an example system according to methods and apparatus for preventing packet retransmissions according to the present invention. All components shown in FIG. 3 reside at a host unit or a network device connected to a network. Application 22 makes requests, for establishment of TCP connection or for transmission of data on a UDP socket. The application sends its socket request to a network interceptor (i.e., network shim) 24. The network interceptor monitors the application's socket request and may notify a security association negotiation component 30 to negotiate a security association. The network interceptor 24 resides between the application 22 and the TCPAP stack 26. An IPsec packet classification component 28 interfaces with the TCPAP stack, and performs the IPsec processing on incoming and outgoing packets. A security association database 32 interfaces with network interceptor 24 and contains a mapping of network flow information (IP addresses, protocol, ports, etc.) to security association information. A security policy database 34 interfaces with network interceptor 24 and contains policies which describe the parameters that are to be used in the negotiation of a security association.

The network interceptor 24 monitors application requests for establishment of a TCP connection, and application requests for transmission of data on a UDP socket. The network interceptor determines if there is a security association already established, and if not, the network interceptor notifies the security association negotiation component, e.g., Internet Key Exchange (IKE), to negotiate one. By monitoring an application's network usage, the network interceptor can insure that security :associations are in place before any packets or network traffic begin to flow. Once a security association is established, the application's request is allowed to proceed. For a TCP connection establishment, the TCP/IP stack may be alerted that it needs to establish the connection. In the case of a UDP packet transmission, the packet may be allowed to proceed to the TCP/IP stack which would process the packet for sending.

As noted previously, without the network interceptor, an application creates a TCP socket and does a "connect". This generates a TCP SYN packet that goes to the driver. The driver realizes that there is no active security association between his machine and the destination machine and, therefore, kicks off an ME negotiation. During this time, the TCP stack notices that it has not received an acknowledge for the SYN packet, so it sends it again (retransmission).

A network interceptor (i.e., network shim) according to the present invention interrupts the application from performing a "connect". Therefore, the network interceptor blocks the application and tells a negotiation component to perform negotiation for a security association.

When a negotiation is completed, the network interceptor lets the "connect" go through to the TCP/IP stack. Now, when the packet hits the driver, a security association is already established. Therefore, instead of the driver dropping the packet (while waiting for a security association to complete), the driver sends the packet out across the network.

When an IP packet comes down the stack to be sent across the network, the packet is compared against filters to determine if a security association is required and needs to be established for protection of the transfer of this packet. A policy is a set of rules. A rule is a condition and its corresponding action. A condition may specify a group of filters which are matched against network traffic (packet) parameters. Filters may be used to match against source address, destination address, source port, destination port, and IP protocol. These filters may be more than just simple values. For example, the source address filter may actually be used to specify an entire subnet. An action is what is to be performed when the corresponding condition evaluates to true (i.e., the network traffic (packet) matches the filters).

When a packet is compared with a filter, it is determined whether a security association is required for protection of the data packet before the data packet is sent across the network. Thus, the IP packet is compared with all filters at the host unit, and if there is a match, the policy defines the appropriate action to take for that particular filter. For example, if a packet has a destination address and destination port suggesting that it is robe sent to "www.intel.com", when the destination address and destination port information from the packet is compared with a filter, a match may occur whereby the policy defines that 3-DES (Data Encryption Standard) encryption should be suggested during the negotiation of a security association as the encryption technique for transferring the data packet to Intel's server. In contrast, if the data packet has a destination address and destination port suggesting that it is to be sent to "www.cnn.com" this information may be compared against all filters and a match obtained for a particular filter, whereby the policy may define that a thatch for that particular filter needs no security association established. Therefore, the packet may be transferred across the network to Cable News Network's (CNN) server without any security. Protocol refers to the protocol associated with the data packet that is used on top of the Internet Protocol, for example, Transmission Control Protocol (TCP), User Datagram Protocol (UDP), Internet Control Message Protocol (ICMP), Internet Group Management Protocol (IGMP), etc.

Figure 4:
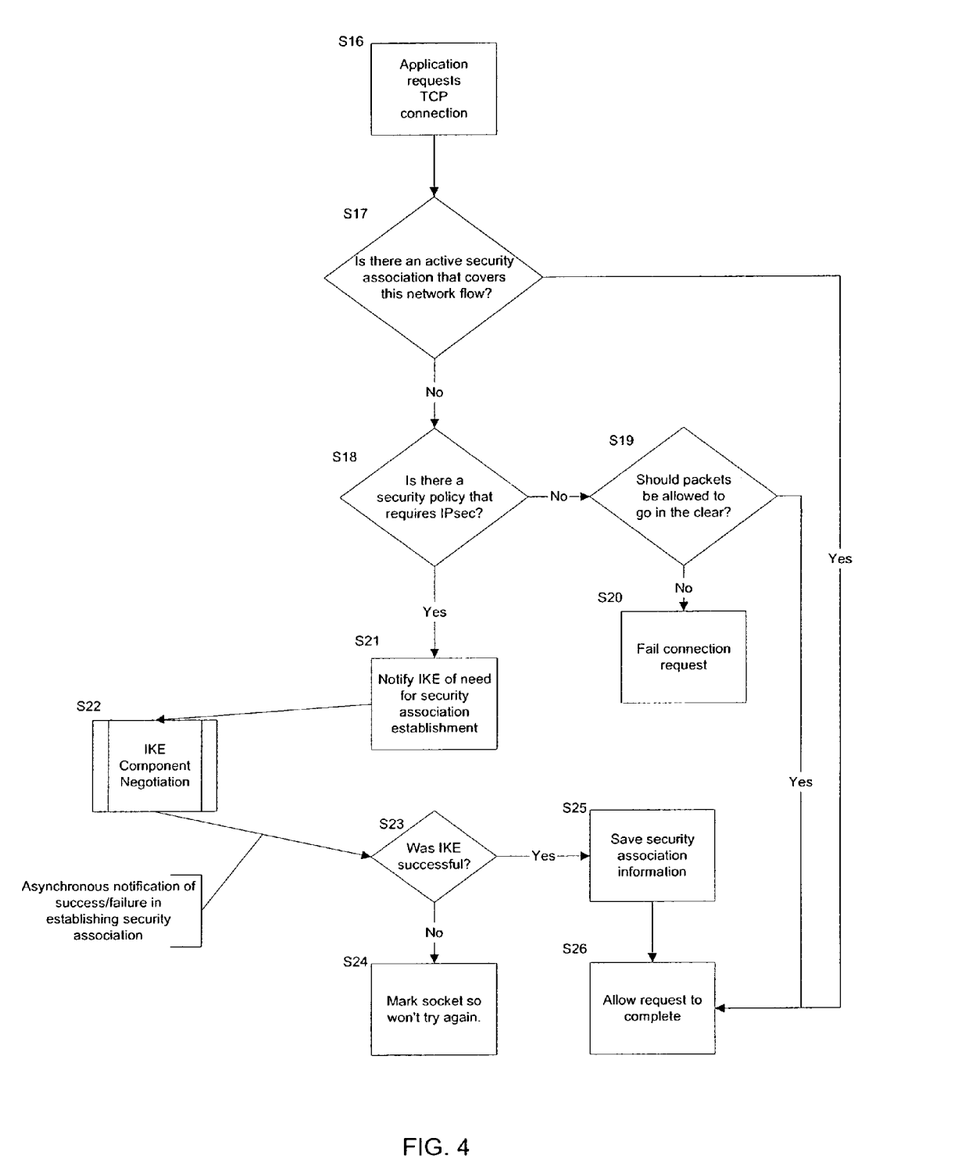
FIG. 4 is a flowchart of an example process for preventing packet retransmissions when an application requests a TCP connection according to example embodiment of the present invention.

FIG. 4 shows a flow chart of an example process for preventing packet retransmissions when an application requests a TCP connection according to an example embodiment of the present invention. Art application makes a request for establishment of a TCP connection S16. It is determined if there is an active security association that covers the network flow associated with the TCP connection request S17. If there is an active security association that covers the network flow, including allowing the communication in the clear, the request is allowed to complete S26, and the TCP connection is established. If there is no active security association that covers the network flow, it is determined if there is a security policy that requires IPsec for the network flow S18. If there is not a security policy that requires IPsec, a determination is made as to whether the packets associated with the TCP connection request may be allowed to be sent across the network without a security association S19. This may occur if the packet matches a filter in which the corresponding action states to allow the traffic to flow in the clear. If the packets cannot be sent without a security association, the connection request fails S20. If the packets may be allowed to go without a security association, the request is allowed to complete S26.

If there is a security policy that requires IPsec S18, the security negotiation component, i.e., IKE, is notified of the need for establishment of a security association S21. IKE then proceeds with negotiation of a security association S22. It is determined whether IKE (Internet Key Exchange) was successful S23. If IKE was successful, the security association information is saved S25, and the request is allowed to complete S26. If IKE was not successful, the socket is marked accordingly so that negotiation will not be attempted again S24.

Figure 5:
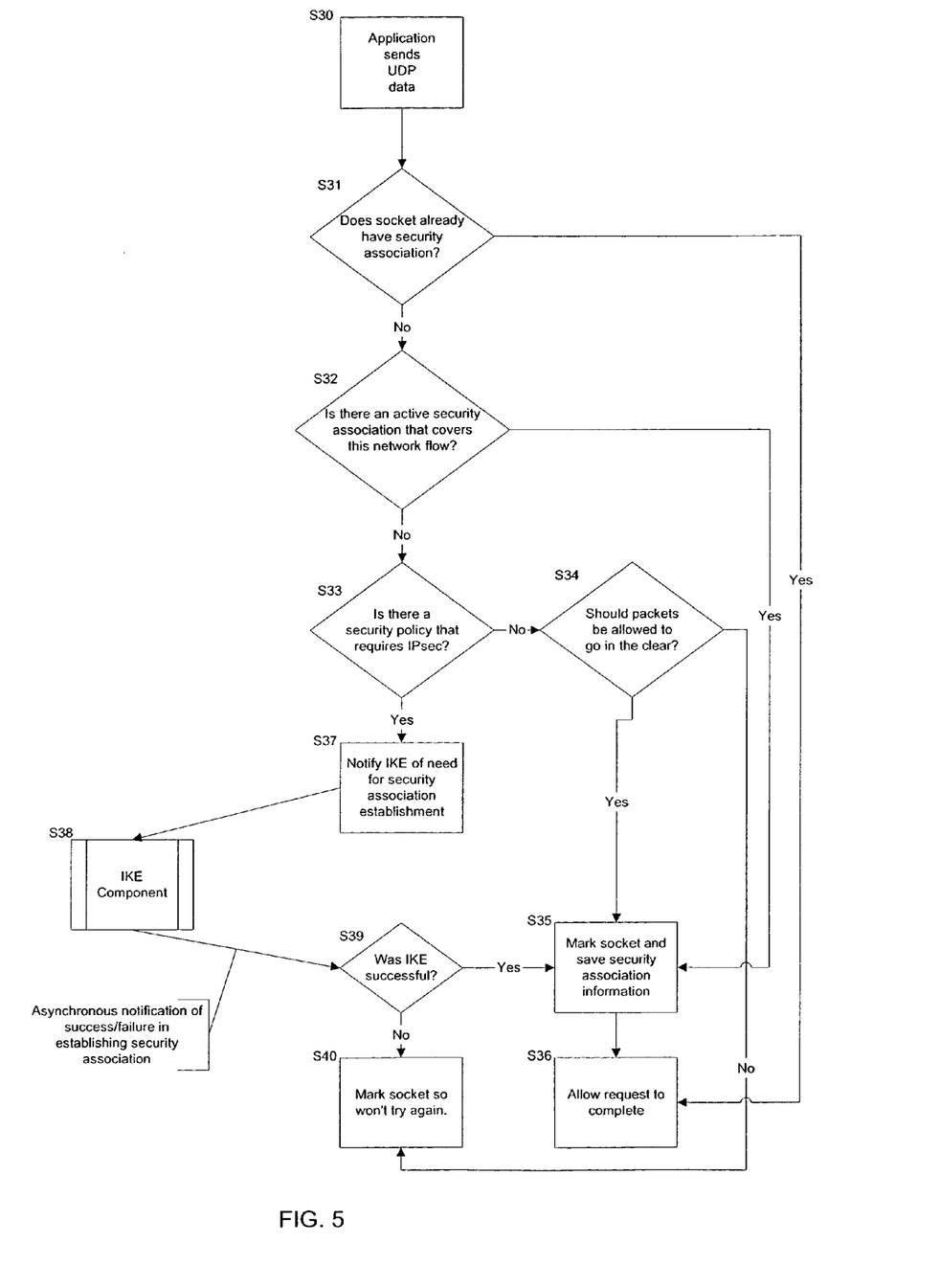
FIG. 5 is a flowchart of an example process for preventing packet retransmissions when an application makes a request for a UDP data transmission according to an example embodiment of the present invention.

FIG. 5 shows a flow chart of an example process for preventing packet retransmissions when an application makes a request for a UDP data transmission according to an example embodiment of the present invention. An application makes a request for a UDP data transmission S30. A determination is made as to whether the socket already has a security association S31. This would apply when there are already transmissions occurring on the requested socket. If the socket already has a security association, the UDP data transmission request is allowed to complete S36. If the socket does not have a security association a determination is made as to whether there is an active security that covers the network flow associated with the UDP data transmission request S32. If there is an active security association that covers this network flow, the socket is marked and the security association information is saved S35. If there is no active security association that covers the network flow, a determination is made as to whether there is a security policy that requires IPsec for the network flow S33. If there is no security policy that requires IPsec, a determination is made as to whether the UDP data packets may be allowed to be transferred in the clear without a security association S34. If the packets can be transmitted without a security association, the socket is marked and the security association information saved S35. The request for UDP data transmission is then allowed to complete S36. If it is determined that the packets need a security association and, therefore, cannot be allowed to travel without one, the socket is marked such that an attempt to transmit the packet will not occur again S40.

If there is a security policy that requires IPsec, the security negotiation component, i.e., IKE, is notified of the need for establishment of a security association S37. IKE then initiates the negotiation process for establishment of a security association S38. It is determined whether IKE was successful in establishing a security association S39. If IKE was successful, the socket is marked and the security association information is saved S35, and the request is allowed to complete S36. If IKE was unsuccessful in negotiating a security association, the socket is marked such that the process will not be attempted again S40.

Preventing packet retransmissions according to the present invention has several advantages. Packets are no longer silently dropped by the driver causing the TCP/IP stack or the application to generate retransmissions. Further, since the TCP/IP stack and applications use only a finite number of retransmissions, some of these retransmissions are no longer wasted because of the driver silently dropping the packets. Currently, connection establishment may be actually delayed even more that just the time it takes to establish the security association. TCP uses a retransmission timer approach that employs longer timeout times the more times it has to retransmit. These timeout values become large (respective to the actual network latency) rather quickly. On average, after a security association is established the TCP/IP stack may wait one half of the current timeout value before attempting to send the connection establishment (SYN) packet. According to the present invention, the first TCP SYN packet is not sent until after the security association is in place.

Moreover, the chances of a TCP connection being rejected are reduced. For example, assume that a TCP/IP stack sends N SYN packets before it gives upon trying to establish the connection. Assume that N–1 of those SYN packets are sent, and silently discarded, during the security association establishment. The TCP/IP stack only has one opportunity now to get the SYN packet through. According to the present invention, the TCP/IP stack will still have N attempts to establish the connection. The same applies to a UDP application that provides it own reliability. Since the network interceptor holds onto a send request until after the security association is successful, the application will wait until the network interceptor finishes the send request before starting a timer on the packet.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

The invention claimed is:

1. A method for preventing packet retransmissions during Internet Protocol (IP) security (IPsec) security association establishment comprising:
   monitoring application socket requests;
   requesting a Transmission Control Protocol (TCP) connection by an application:
   determining if there is an active IPsec security association that exists to protect network flow associated with the connection request;
   preventing the connection request from proceeding to the Transmission Control Protocol of the TCP/IP stack if no active IPsec security association exists to protect the network flow;
   determining if an IPsec security policy exists for the network flow if no active IPsec security association exists to protect the network flow;
   alerting a security association negotiation component to initiate negotiation for the IPsec security association based on the IPsec security policy if the IPsec security policy exists for the network flow; and
   allowing the connection request to proceed to the Transmission Control Protocol after the IPsec security association is established from the negotiation.

2. The method of claim 1, wherein the IPsec security association comprises an Internet Key Exchange (IKE) component.

3. The method of claim 1, wherein the IPsec security association is based on one or more of: a source (IP) address, a destination IP address, a protocol, a source port, and a destination port.

4. The method of claim 3, wherein the protocol comprises one or more of:
   TCP;
   User Datagram Protocol (UDP);
   Internet Control Message Protocol (ICMP); and
   Internet Group Management Protocol (IGMP).

5. The method of claim 1, further comprising retrieving the IPsec security association from a database.

6. The method of claim 5, wherein the database contains mappings between network flow information and the IPsec security association.

7. The method of claim 6, wherein the network flow information comprises one or more of: a source IP address, a destination IP address, a protocol, a source port, and a destination port.

8. The method of claim 1, further comprising retrieving the IPsec security policy from the database.

9. A method for preventing packet retransmissions during Internet Protocol (IP) security (IPsec) security association establishment comprising:
   monitoring application socket requests;
   requesting transmission of data on a User Datagram Protocol socket by an application;
   determining if the socket has been associated with an active IPsec security association;
   determining if there is a defined IPsec security association that may be used to protect network flow if the socket has not been associated with an active IPsec security association;
   determining what IPsec security policy should be used when negotiating an IPsec security association for the network flow if there is no defined IPsec security association that may be used to protect the network flow;
   preventing the data from being sent to the User Datagram Protocol of the Transmission Control Protocol (TCP)/IP stack if there is no defined IPsec security association that may be used to protect the network flow;
   alerting a security association negotiation component to initiate negotiation for the IPsec security association if there is no defined IPsec security association that may be used to protect the network flow;
   establishing the IPsec security association; and
   allowing the data to be sent in response to establishment of the IPsec security association.

10. The method of claim 9, wherein the security association negotiation component comprises an Internet Key Exchange (IKE) component.

11. The method of claim 9, comprising negotiating for the IPsec security association using IPsec security parameters specified by the IPsec security policy.

12. The method of claim 9, wherein the second determining comprises comparing filters with one or more of: a source IP address, a destination IP address, a protocol, a source port, and a destination port, wherein the destination port includes one or more of a source IP address, a destination IP address, a protocol, a source port, and a destination port related to the network flow.

13. The method of claim 12, wherein each filter comprises one or more of:
   a source Internet Protocol (IP) address;
   a destination IP address;
   a protocol;
   a source port; and
   a destination port.

14. The method of claim 12, wherein the IPsec security policy comprises at least one filter.

15. The method of claim 9, further comprising determining if the network flow can be allowed without the IPsec security association if no IPsec security policy exists for the network flow.

16. A system comprising:
   a network interceptor between an application and the Transmission Control Protocol (TCP) of the TCP/Internet Protocol (IP) stack, the network, the network interceptor to monitor a TCP connection request by the application;
   a security association database coupled to the network interceptor, the security association database containing a mapping of network flow information to IP security (IPsec) security association information;
   a security policy database coupled to the network interceptor, the security policy database containing policies that describe parameters that are to be used in a negotiation of an IPsec security association;
   a security association negotiation component coupled with the network interceptor, the security association negotiation component to negotiate a an IPsec security association to protect network flow associated with the TCP connection request and to establish the IPsec security association;

the network interceptor to allow the TCP connection request to proceed to the Transmission Control Protocol after the IPsec security association is established; and an IPsec packet classifier, the IPsec packet classifier responsible for performing IPsec processing on incoming and outgoing packets, wherein the network interceptor insures that an IPsec security association is in place before allowing network traffic to flow between the application and the Transmission Control Protocol.

17. The system of claim 16, wherein the network flow information comprises one or more of: IP addresses, a protocol, and ports.

18. A machine-readable medium having stored thereon data representing sets of instructions which, when executed by a machine, cause the machine to:
monitor application socket requests;
request a Transmission Control Protocol (TCP) connection by an application;
determine if there is an active Internet Protocol (IP) security (IPsec) security association that exists to protect network flow associated with the connection request;
prevent the connection request from proceeding to the Transmission Control Protocol of the TCP/IP stack if no active IPsec security association exists to protect the network flow;
determine if an IPsec security policy exists for the network flow if no active IPsec security association exists to protect the network flow;
alert a security association negotiation component to initiate negotiation for an IPsec security association based on the IPsec security policy if the IPsec security policy exists for the network flow; and
allow the connection request to proceed to the Transmission Control Protocol after the IPsec security association is established from the negotiation.

19. The machine-readable medium of claim 18, wherein the security association negotiation component comprises an Internet Key Exchange (IKE) component.

20. The machine-readable medium of claim 18, wherein the active IPsec security association comprises one or more of: a source IP, a destination IP, a protocol, a source port, and a destination port.

21. A machine-readable medium having stored thereon data representing sets of instructions which, when executed toy a machine, cause the machine to:
monitor application socket requests;
request transmission of data on a User Datagram Protocol (UDP) socket by the application;
determine if the socket has been associated with an active Internet Protocol (IP) security (IPsec) security association;
determine if there is a defined IPsec security association that may be used to protect network flow if the socket has not been associated with an active IPsec security association;
determine what IPsec security policy should be used when negotiating an IPsec security association for the network flow if there is no defined IPsec security association that may be used to protect the network flow;
prevent the data from being sent to the User Datagram Protocol of the Transmission Control Protocol (TCP)/IP stack if there is no defined IPsec security association that may be used to protect the network flow;
alert a security association negotiation component to initiate negotiation for the IPsec security association if there is no defined IPsec security association that may be used to protect the network flow;
establish the IPsec security association; and
allow the data to be sent in response to establishment of the IPsec security association.

22. The machine-readable medium of claim 21, wherein the security association negotiation component comprises an Internet Key Exchange (IKE) component.

23. The machine-readable medium of claim 21, wherein the security association negotiation component negotiates for the IPsec security association using IPsec security parameters specified by a an IPsec security policy.

24. The machine-readable medium of claim 21, wherein the active IPsec security association comprises one or more of: a source IP, a destination IP, a protocol, a source port, and a destination port.

25. The system of claim 16, further comprising an Internet Key Exchange (IKE) component.

* * * * *

UNITED STATES PATENT AND TRADEMARK OFFICE
CERTIFICATE OF CORRECTION

| | | |
|---|---|---|
| PATENT NO. | : 7,028,332 B1 | Page 1 of 1 |
| APPLICATION NO. | : 09/592841 | |
| DATED | : April 11, 2006 | |
| INVENTOR(S) | : Jason, Jr. | |

It is certified that error appears in the above-identified patent and that said Letters Patent is hereby corrected as shown below:

In column 3, at line 39, delete "tact" and insert --fact--.

In column 4, at line 32, delete "ME" and insert --IKE--.

In column 5, at line 1, delete "robe" and insert --to be--.

In column 5, at line 12, delete "thatch" and insert --match--.

In column 7, at line 17, delete ":" and insert --;--.

In column 7, at line 39, delete "(IP)" and insert --IP--.

In column 8, at line 51, delete first occurrence of "the network,".

In column 8, at line 64, delete "a".

Signed and Sealed this

Sixth Day of November, 2007

JON W. DUDAS
*Director of the United States Patent and Trademark Office*